(12) United States Patent
Kelner et al.

(10) Patent No.: US 12,019,899 B2
(45) Date of Patent: Jun. 25, 2024

(54) DATA RELOCATION WITH PROTECTION FOR OPEN RELOCATION DESTINATION BLOCKS

(71) Applicant: Western Digital Technologies, Inc., San Jose, CA (US)

(72) Inventors: Vered Kelner, Gan Haim (IL); Marina Frid, Jerusalem (IL); Igor Genshaft, Bat Yam (IL)

(73) Assignee: Western Digital Technologies, Inc., San Jose, CA (US)

( * ) Notice: Subject to any disclaimer, the term of this patent is extended or adjusted under 35 U.S.C. 154(b) by 87 days.

(21) Appl. No.: 17/653,364

(22) Filed: Mar. 3, 2022

(65) Prior Publication Data

US 2023/0280926 A1 Sep. 7, 2023

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ..... G06F 3/0652; G06F 3/0604; G06F 3/0679
See application file for complete search history.

(56) References Cited

U.S. PATENT DOCUMENTS

| 7,325,052 | B1 * | 1/2008 | Motoyama | G06F 21/554 358/1.14 |
| 7,610,437 | B2 * | 10/2009 | Sinclair | G06F 3/0652 711/104 |
| 7,984,084 | B2 * | 7/2011 | Sinclair | G06F 16/1847 707/818 |
| 8,285,918 | B2 * | 10/2012 | Maheshwari | G11C 7/1072 711/159 |

(Continued)

FOREIGN PATENT DOCUMENTS

| KR | 20190102790 A | * | 9/2019 |
| WO | 2021070014 A1 | | 4/2021 |

OTHER PUBLICATIONS eleanorhanks, "RAM", Oct. 31, 2017, pp. 1-5, https://getrevising.co.uk/grids/ram (Year: 2017).*

(Continued)

*Primary Examiner* — Christopher D Birkhimer
(74) *Attorney, Agent, or Firm* — PATTERSON + SHERIDAN, LLP

(57) ABSTRACT

A data storage device includes a memory device and a controller coupled to the memory device. The controller is configured to relocate first valid data from a first source block to a destination block, relocate second valid data from a second source block to the destination block, determine that the destination block is closed, re-mark the first and second source block with a second indication, and erase the source blocks that have the second indication. The first (Continued)

source block and the second source block are marked with a first indication after each respective data is relocated. The first indication indicates that the source block cannot be freed. The second indication indicates that the destination block is closed and the associated source blocks can be erased. Prior to closing the destination block, parity data may be generated for the data of the destination block and programmed to the destination block.

13 Claims, 6 Drawing Sheets

(56) References Cited

U.S. PATENT DOCUMENTS

| | | | | |
|---|---|---|---|---|
| 8,429,359 | B1* | 4/2013 | Desai | G06F 11/1461 |
| | | | | 711/E12.103 |
| 8,443,263 | B2* | 5/2013 | Selinger | G06F 11/1068 |
| | | | | 714/768 |
| 8,538,919 | B1* | 9/2013 | Nielsen | H04L 63/0272 |
| | | | | 718/1 |
| 8,593,678 | B2* | 11/2013 | Ohishi | H04N 1/2166 |
| | | | | 358/1.15 |
| 8,873,284 | B2* | 10/2014 | Sinclair | G06F 12/0246 |
| | | | | 365/185.11 |
| 8,909,942 | B1* | 12/2014 | Obukhov | G06F 12/1408 |
| | | | | 257/659 |
| 9,075,705 | B2* | 7/2015 | Hikichi | G06F 11/004 |
| 9,092,182 | B2* | 7/2015 | Ohishi | H04N 1/00944 |
| 9,111,621 | B2* | 8/2015 | Krutzik | G11C 16/22 |
| 9,223,693 | B2* | 12/2015 | Sinclair | G06F 12/0246 |
| 9,336,133 | B2* | 5/2016 | Sinclair | G06F 12/0246 |
| 9,344,596 | B2* | 5/2016 | Ohishi | H04N 1/00973 |
| 9,348,746 | B2* | 5/2016 | Sinclair | G06F 12/0246 |
| 9,465,731 | B2* | 10/2016 | Sinclair | G06F 12/0246 |
| 9,652,382 | B1* | 5/2017 | Subramanian | G06F 12/0253 |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 9,800,291 | B1* | 10/2017 | Ben David | G06F 11/1415 |
| 9,842,060 | B1* | 12/2017 | Jannyavula Venkata | |
| | | | | G06F 3/0659 |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,372,341 | B2 | 8/2019 | Oshinsky et al. | |
| 10,409,518 | B1* | 9/2019 | Xie | G06F 3/0679 |
| 10,430,279 | B1* | 10/2019 | Dittia | G06F 3/0656 |
| 10,613,943 | B2 | 4/2020 | Guo et al. | |
| 10,732,877 | B1* | 8/2020 | Gopalakrishnan | |
| | | | | G11C 11/5642 |
| 10,795,812 | B1* | 10/2020 | Duggal | G06F 3/067 |
| 10,983,715 | B2* | 4/2021 | Sharoni | G06Q 20/105 |
| 11,086,537 | B2* | 8/2021 | Byun | G06F 3/0679 |
| 11,093,139 | B1* | 8/2021 | Karr | G06F 3/0685 |
| 11,138,071 | B1* | 10/2021 | Agarwal | G06F 3/061 |
| 2001/0025340 | A1* | 9/2001 | Marchant | G06F 21/6272 |
| | | | | 713/150 |
| 2004/0117414 | A1* | 6/2004 | Braun | G06F 8/65 |
| 2006/0004957 | A1* | 1/2006 | Hand, III | G06F 12/0866 |
| | | | | 711/E12.019 |
| 2006/0005074 | A1* | 1/2006 | Yanai | G06F 11/2066 |
| | | | | 714/6.32 |
| 2006/0184720 | A1 | 8/2006 | Sinclair et al. | |
| 2007/0033325 | A1* | 2/2007 | Sinclair | G06F 3/0608 |
| | | | | 711/170 |
| 2008/0082596 | A1* | 4/2008 | Gorobets | G06F 12/0253 |
| 2008/0140902 | A1* | 6/2008 | Townsend | H04B 1/0475 |
| | | | | 710/306 |
| 2008/0189477 | A1* | 8/2008 | Asano | G06F 12/0246 |
| | | | | 711/E12.008 |
| 2008/0307020 | A1* | 12/2008 | Ko | G06F 21/6245 |
| 2009/0172267 | A1* | 7/2009 | Oribe | G11C 16/3418 |
| | | | | 711/E12.008 |
| 2009/0177895 | A1* | 7/2009 | Murayama | G06F 21/6236 |
| | | | | 711/E12.001 |
| 2009/0220088 | A1* | 9/2009 | Lu | G06F 21/554 |
| | | | | 713/189 |
| 2011/0145473 | A1* | 6/2011 | Maheshwari | G06F 12/12 |
| | | | | 711/E12.008 |
| 2011/0161784 | A1* | 6/2011 | Selinger | G06F 11/1016 |
| | | | | 714/E11.002 |
| 2011/0236049 | A1* | 9/2011 | Haga | G03G 15/5004 |
| | | | | 399/75 |
| 2013/0024423 | A1* | 1/2013 | Doshi | G06F 11/1448 |
| | | | | 707/640 |
| 2013/0173554 | A1* | 7/2013 | Ubukata | G06F 11/2094 |
| | | | | 707/640 |
| 2014/0153034 | A1* | 6/2014 | Fukushima | H04N 1/21 |
| | | | | 358/1.14 |
| 2014/0208003 | A1* | 7/2014 | Cohen | G06F 3/0619 |
| | | | | 711/103 |
| 2014/0325148 | A1* | 10/2014 | Choi | G06F 3/0659 |
| | | | | 711/114 |
| 2014/0365719 | A1* | 12/2014 | Kuzmin | G06F 12/0246 |
| | | | | 711/103 |
| 2015/0227602 | A1* | 8/2015 | Ramu | G06F 11/1456 |
| | | | | 707/634 |
| 2015/0339188 | A1* | 11/2015 | Hu | G06F 11/3034 |
| | | | | 714/704 |
| 2016/0246713 | A1* | 8/2016 | Choi | G06F 3/0608 |
| 2017/0123655 | A1* | 5/2017 | Sinclair | G06F 3/061 |
| 2017/0132082 | A1* | 5/2017 | Resch | G06F 11/1076 |
| 2017/0139823 | A1* | 5/2017 | Tomlin | G06F 3/0643 |
| 2017/0277448 | A1* | 9/2017 | Khoueir | G06F 3/0616 |
| 2017/0329532 | A1* | 11/2017 | Goss | G11C 29/52 |
| 2017/0351439 | A1 | 12/2017 | Janik | |
| 2018/0024920 | A1 | 1/2018 | Thomas et al. | |
| 2018/0189175 | A1* | 7/2018 | Ji | G06F 3/0679 |
| 2018/0239545 | A1* | 8/2018 | Frid | G06F 3/0619 |
| 2018/0307848 | A1* | 10/2018 | Leiseboer | G06F 21/78 |
| 2018/0357010 | A1* | 12/2018 | Inbar | G06F 3/0619 |
| 2019/0004700 | A1* | 1/2019 | Oshinsky | G06F 12/0246 |
| 2019/0278508 | A1* | 9/2019 | Pepper | G06F 3/0652 |
| 2020/0089420 | A1* | 3/2020 | Sharoni | G06Q 20/354 |
| 2020/0105363 | A1 | 4/2020 | Natarajan et al. | |
| 2020/0192794 | A1* | 6/2020 | Lee | G06F 12/0246 |
| 2020/0310686 | A1* | 10/2020 | Truong | G06F 3/061 |
| 2021/0191853 | A1 | 6/2021 | Xu et al. | |
| 2021/0318810 | A1 | 10/2021 | Tao et al. | |
| 2021/0334031 | A1* | 10/2021 | Grayson | G06F 9/30029 |
| 2021/0342362 | A1* | 11/2021 | Haravu | G06F 11/1464 |
| 2021/0406216 | A1* | 12/2021 | Komatsu | G06F 16/128 |

OTHER PUBLICATIONS

Computer Hope, "Move", Feb. 15, 2015, pp. 1, https://web.archive.org/web/20150215173903/https://www.computerhope.com/jargon/m/move.htm (Year: 2015).*

Dictionary.com, "relocate", May 9, 2018, pp. 1-5, https://web.archive.org/web/20180509143157/http://www.dictionary.com/browse/relocate (Year: 2018).*

International Search Report and Written Opinion for International Application No. PCT/US2022/030439 dated Nov. 21, 2022.

* cited by examiner

DATA RELOCATION WITH PROTECTION FOR OPEN RELOCATION DESTINATION BLOCKS

BACKGROUND OF THE DISCLOSURE

Field of the Disclosure

Embodiments of the present disclosure generally relate to data storage devices, such as solid state drives (SSDs), and, more specifically, protecting data located in open relocation destination blocks.

Description of the Related Art

Data storage devices may include one or more memory devices that may be used to store data, such as user data for one or more hosts, metadata, control information, and the like. During operation of a data storage device, the data stored in the one or more memory devices may be moved as part of a data management operation. For example, valid data may be consolidated in a destination block in order to recover memory space as part of a garbage collection operation. When data is programmed to the memory device, the data is also programmed with protection against errors. For example, the data may be encoded with one or more of error correction code (ECC), cyclic redundancy code (CRC), parity data, exclusive or (XOR) data, and the like.

Furthermore, blocks of the memory device that are currently being programmed to and/or opened may accumulate errors over time. In order to avoid accumulating errors in open blocks, the data storage device may close an open block by programming pad data to the open blocks until the open block is filled. When the open block is filled, the data storage device may close the open block in order to avoid errors from accumulating in the filled open block. However, filling an open block with pad data may decrease the available storage space of the memory device, which may lead to less than advertised storage capabilities. Likewise, by programming additional data protection data to the open blocks, less user data may be stored in the open blocks as the additional data protection data is stored in the open blocks.

Therefore, there is a need in the art for an improved data relocation operation to protect open relocation destination blocks.

SUMMARY OF THE DISCLOSURE

The present disclosure generally relates to data storage devices, such as solid state drives (SSDs), and, more specifically, protecting data located in open relocation destination blocks. A data storage device includes a memory device and a controller coupled to the memory device. The controller is configured to relocate first valid data from a first source block to a destination block, relocate second valid data from a second source block to the destination block, determine that the destination block is closed, re-mark the first and second source block with a second indication, and erase the source blocks that have the second indication. The first source block and the second source block are marked with a first indication after each respective data is relocated. The first indication indicates that the source block cannot be freed. The second indication indicates that the destination block is closed and the associated source blocks can be erased. Prior to closing the destination block, parity data may be generated for the data of the destination block and programmed to the destination block.

In one embodiment, a data storage device includes a memory device and a controller coupled to the memory device. The controller is configured to relocate first valid data from a first source block to a destination block, where the first source block is marked with a first indication to indicate that that first source block cannot be freed, relocate second valid data from a second source block to the destination block, where the second source block is marked with the first indication to indicate that that second source block cannot be freed, determine that the destination block is closed, and erase the first source block and the second source block.

In another embodiment, a data storage device includes a memory device and a controller coupled to the memory device. The controller is configured to relocate data from a source block to a destination block without erasing the relocated data from the source block and erase the source block when the destination block is closed.

In another embodiment, a data storage device includes memory means and a controller coupled to the memory means. The controller is configured to erase a source block during a control sync (CS) operation having an indication of can be freed. The erasing occurs after a destination block including valid data of the source block is closed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, protecting data located in open relocation destination blocks. A data storage device includes a memory device and a controller coupled to the memory device. The controller is configured to relocate first valid data from a first source block to a destination block, relocate second valid data from a second source block to the destination block, determine that the destination block is closed, re-mark the first and second source block with a second indication, and erase the source blocks that have the second indication. The first source block and the second source block are marked with a first indication after each respective data is relocated. The first indication indicates that the source block cannot be freed. The second indication indicates that the destination block is closed and the associated source blocks can be erased. Prior to closing the destination block, parity data may be generated for the data of the destination block and programmed to the destination block.

Figure 1:
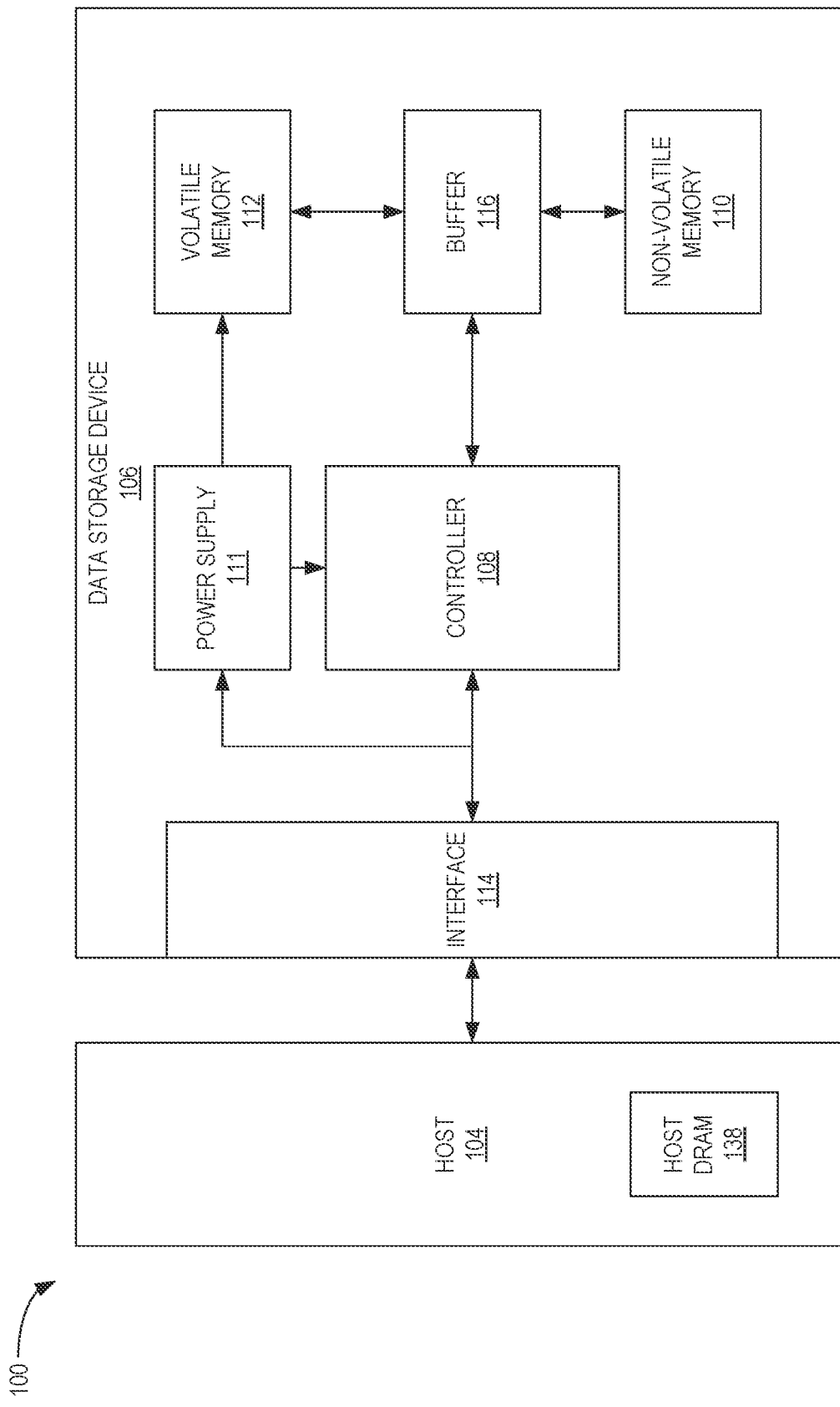
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
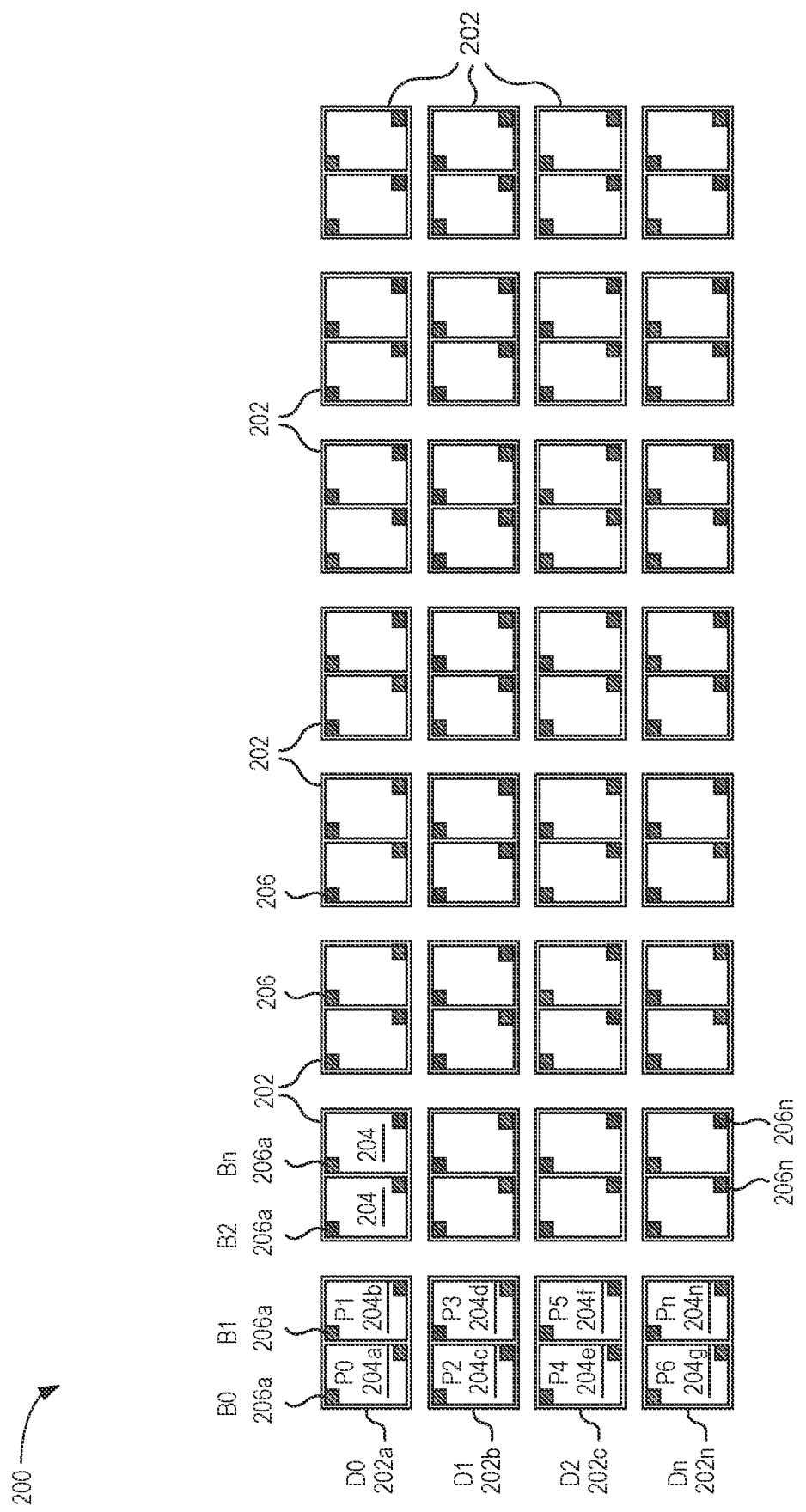
FIG. 2 is an illustration of a superblock of a memory device, according to certain embodiments.

FIG. 2 is an illustration of a superblock of a memory device 200, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. It is to be understood that each die may include more than two planes (e.g., 4 planes, 8 planes, etc.). It is to be understood that the embodiments herein may be applicable to any die architecture having one or more planes. Each of the planes 204 includes a plurality of blocks 206a-206n, collectively referred to as block 206. While 32 dies 202 are shown in the memory device 200, any number of dies may be included. Furthermore, data may be written sequentially in a per block and per plane basis so that data is written to B0 206a before data is written to B1 206b.

Figure 3:
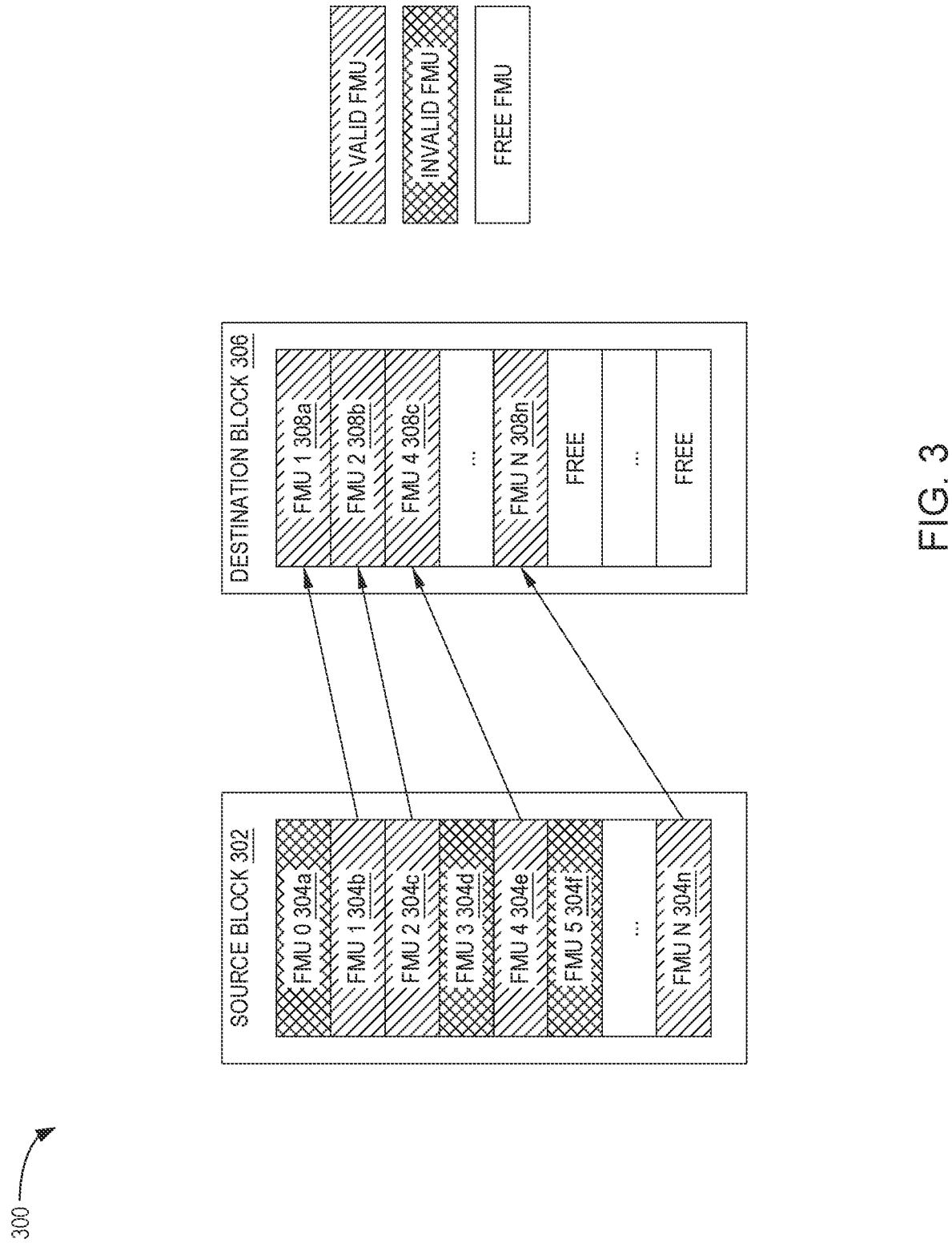
FIG. 3 is a block diagram illustrating moving valid data from source block to a destination block, according to certain embodiments.

FIG. 3 is a block diagram 300 illustrating moving valid data from source block 302 to a destination block 306, according to certain embodiments. For example, the source block 302 may be B0 206a of the first plane 204a and the destination block 306 may be B1 206b of the second plane 204b. The source block 302 includes a plurality of flash management units (FMUs) 304a-304n. Each FMU of the plurality of FMUs 304a-304n may be equal to a maximum storage unit of each block. Furthermore, each FMU may be mapped in a logical block address (LBA) to physical block address (PBA) (L2P) table, which may be stored in volatile memory, such as the volatile memory 112 of FIG. 1, a host memory buffer (HMB) of a host DRAM, such as the host DRAM 138 of FIG. 1, and/or a controller memory buffer (CMB) of a controller, such as the controller 108 of FIG. 1, and/or an NVM, such as the NVM 110 of FIG. 1. For exemplary purposes, aspects of FIG. 1 may be referenced herein.

When a data management operation occurs, such as garbage collection, the controller 108 may scan a closed block that includes data. A closed block may refer to a block that is not able to be programmed to. An open block may refer to a block that is able to be programmed to. For example, the destination block 306 may be an open block. Open blocks may be closed due to a time threshold being met or exceeded or due to the open block being filled to capacity or past a threshold size. For example, the source block 302 may be a closed block. The plurality of FMUs 304a-304n may either be valid FMUs or invalid FMUs. For example, FMU 0 304a, FMU 3 304d, and FMU 5 304f are invalid FMUs and FMU 1 304b, FMU 2 304c, FMU 4 304e, and FMU N 304n are valid FMUs. Invalid FMUs may be FMUs whose data is updated in a different location of the memory device, which may be a different block or the same block. Valid FMUs may be FMUs whose data has not been updated in a different location of the memory device. The controller 108 may store indicators corresponding to valid data and invalid data as well as a mapping of valid data to invalid data. For example, the indicators and/or mappings may be part of a L2P table.

During a data management operation, such as garbage collection, valid FMUs are moved from a selected source block, such as the source block 302, to a destination block, such as the destination block 306. The destination block 306 includes at least one free FMU, where data may be programmed to the at least one free FMU. If the destination block 306 is filled to capacity, then the controller 108 may choose another destination block that has available space to program data to for the data management operation. In the current example, FMU 1 304b, FMU 2 304c, FMU 4 304e, and FMU N 304n are programmed to the destination block 306, where FMU 1 is now denoted as FMU 1 308a, FMU2 304c is now denoted as FMU 2 308b, FMU 4 304e is now denoted as FMU 4 308c, and FMU N 304n is now denoted as FMU N 308n. After the valid FMUs are moved to the destination block 306, the controller 108 may erase the source block 302 in order to recover memory space for future write operations.

The valid FMUs programmed to the destination block 306 may still include data protection mechanisms, such as ECC data, XOR data, parity data, CRC data, and the like. However, in other embodiments, the source block 302 may not be erased until the destination block 306 is closed. If the source block 302 is not erased until the destination block 306 is closed, the data protection mechanisms for data relocated to the destination block 306 may not be needed. Thus, the destination block 306 may store additional data not found in the source block 302. It is to be understood that although only the source block 302 is exemplified, the embodiments described herein may also be applicable to valid data of two or more source blocks being relocated to the destination block 306.

If data in the destination block 306 is found to be corrupted or have errors, such as through a post-write read operation, a read operation, or the like, then the data may be recovered using the relevant source block data. For example, if FMU 1 308a becomes corrupted, such as due to aggregating one or more flipped bits or errors, then the data of FMU 1 308a may be recovered using FMU 1 304b of the source block 304b. Thus, by not erasing the source block 302 until the destination block 306 is closed, additional data may be programmed to the destination block 306 while still retaining data protection mechanisms for the data relocated to the destination block 306 from the source block 302.

Furthermore, when the destination block 306 is closed or about to be closed, such as when the controller 108 determines that the destination block 306 is either filled to a minimum threshold limit for closing a block or has been open for at least a predetermined threshold period of time, the controller 108 may then generate parity data for the closed or about to be closed destination block 306. In one example, if the destination block 306 has available memory space and is not yet closed, then the controller 108 may program the generated parity data to the destination block 306. The generated parity data may be a minimal amount of parity data to protect the data stored in the destination block 306. In other examples, even if the destination block 306 has available memory space and is not yet closed, the controller 108 may program the generated parity data to a selected block for parity data. In the previously described example, the controller 108 may program dummy data to the destination block 306 to fill and close the destination block. In yet another example, if the destination block 306 is filled and/or closed, the controller 108 may program the generated parity data to a selected block for parity data.

Figure 4:
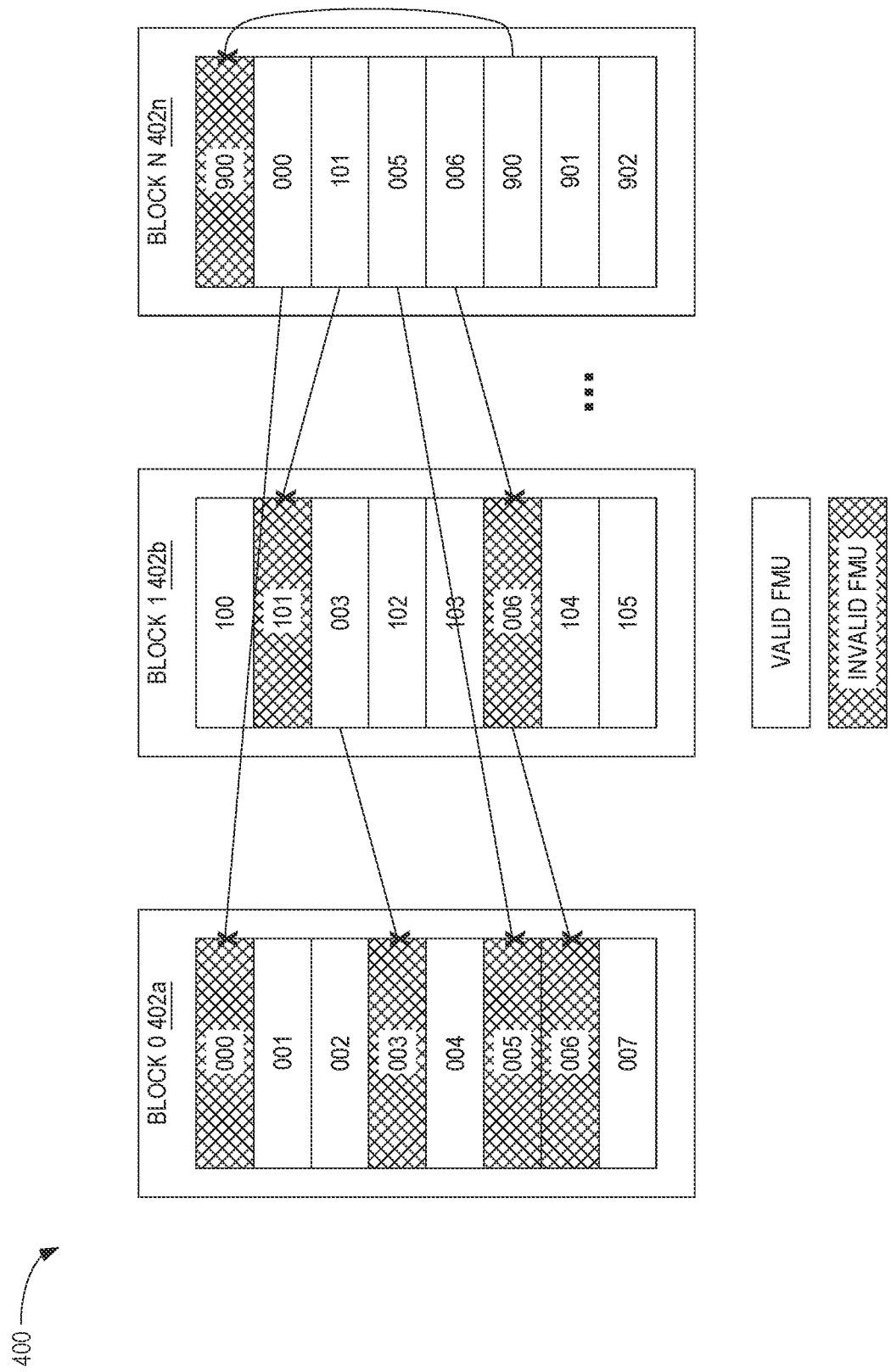
FIG. 4 is a block diagram illustrating mapping valid data to invalid data in a plurality of blocks, according to certain embodiments.

FIG. 4 is a block diagram 400 illustrating mapping valid data to invalid data in a plurality of blocks 402a-402n, according to certain embodiments. The plurality of blocks 402a-402n may be part of an NVM, such as the NVM 110 of FIG. 1. FMUs including invalid data are denoted by a crosshatched pattern and FMUs including valid data do not have a pattern. For example, in block 0 402a, FMUs 000, 003, 005, and 006 are invalid FMUs and FMUs 001, 002, 004, and 007 are valid FMUs. Invalid FMUs may be FMUs whose data is updated in a different block or in the same block. For example, block 1 402b includes FMU 003, which may be updated data corresponding to FMU 003 of block 0 402a, and FMU 006, which may be updated data corresponding to FMU 006 of block 402a. However, FMU 006 of block 1 402b is not the most recent update to the data. Block n 402n includes FMU 006 which may be the most updated version of the data corresponding to FMU 006. Likewise, in block n 402n, FMU 900 is updated within the same block, as indicated by the line with an x-head.

A controller, such as the controller 108 of FIG. 1, may track the updates to the FMUs, where the updates may be stored in a table, such as a L2P table. The stored entries may have a pointer indicating where the updated data is. For example, if the controller 108 searches for FMU 000 in block 0 402a, the controller 108 may first parse through the table storing the table entries corresponding to FMU updates for the relevant entry. Based on the relevant entry, the controller 108 determines that FMU 000 in block 0 402a is not the most recent update to the FMU 000 data. Rather, the controller 108 may determine that the most recent update to the FMU 000 data is in block n 402n.

Figure 5:
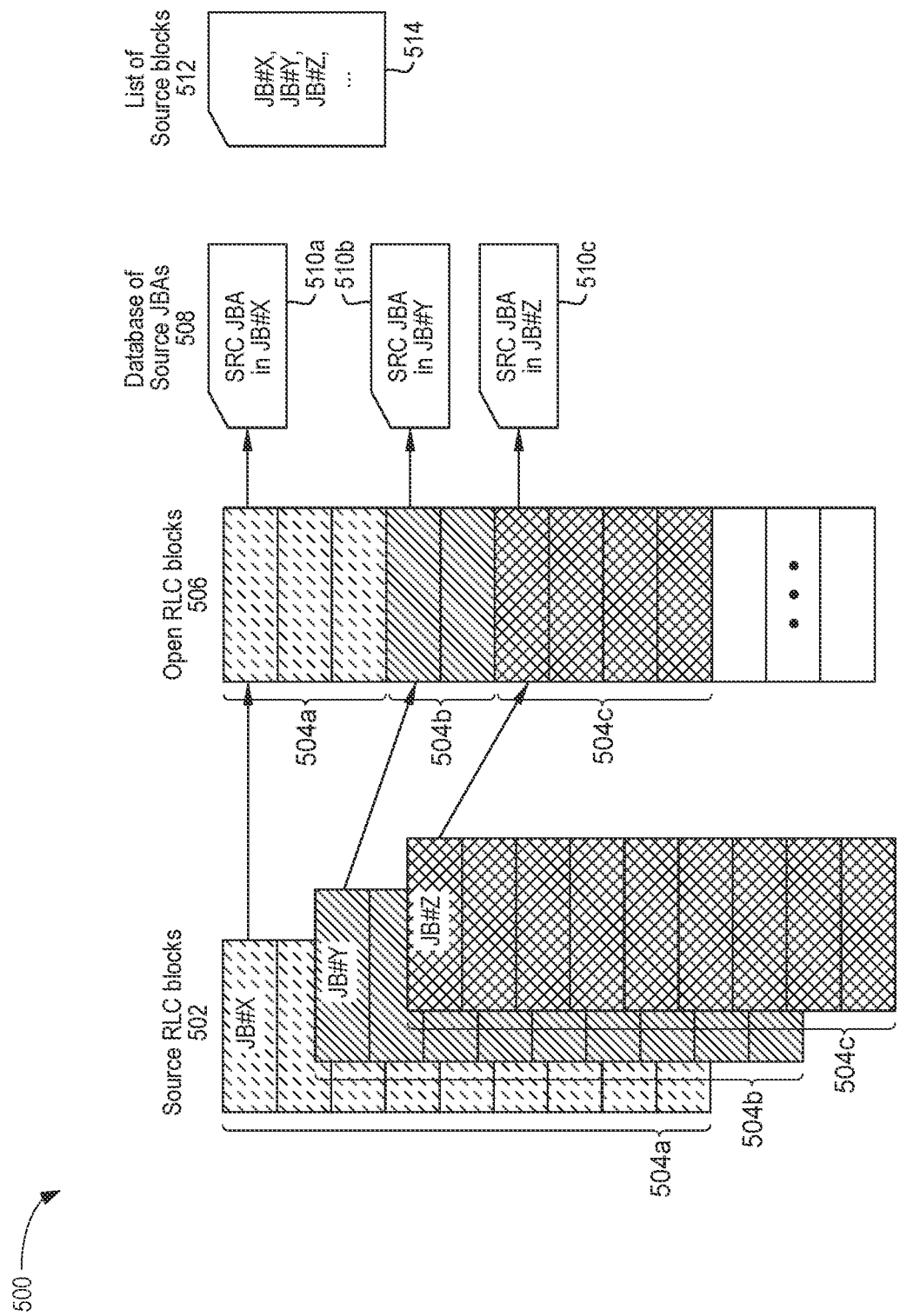
FIG. 5 is a block diagram illustrating a data management operation, according to certain embodiments.

FIG. 5 is a block diagram 500 illustrating a data management operation, according to certain embodiments. Relocation (RLC) source blocks 502 include a first source RLC block 504a, a second source RLC block 504b, and a third source RLC block 504c. In one example, a controller, such as the controller 108 of FIG. 1, may initiate a data management operation, such as garbage collection or wear-leveling. Valid data or FMUs from the first source RLC block 504a, the second source RLC block 504b, and the third RLC block 504c are relocated to an open RLC block 506. The open RLC block 506 is a destination block. Data of each relocated block may be programmed sequentially to the open RLC block 506. For example, the valid data or FMUs of the first source RLC block 504a is first programmed to the open RLC block 506, followed by the valid data or FMUs of the second RLC block 504b, and finally the valid data or FMUs of the third RLC block 504c. For simplification purposes, the valid data or FMUs of the first source RLC block 504a, the second source RLC block 504b, and the third RLC block 504c in the open RLC block 506 are noted with the same reference numerals corresponding to the same the first source RLC block 504a, the second source RLC block 504b, and the third RLC block 504c in the RLC source blocks 502.

The controller 108 may maintain a database of source jumbo block addresses (JBAs) 508, where the database of source JBAs 508 may store a plurality of entries, where each entry corresponds to a JBA, a FMU, or the like. For example, the database of source JBAs 508 includes a first entry 510a that corresponds to the valid data of the first RLC block 504a, a second entry 510b that corresponds to the valid data of the second RLC block 504b, and a third entry 510c that corresponds to the valid data of the third RLC block 504c. It is to be understood that each entry may comprise a plurality of sub-entries, where each sub-entry is a data mapping for a relevant FMU or data of the entry.

Furthermore, each entry and/or sub-entry may also include an indication that indicates if the source data may be erased. For example, when the open RLC block 506 remains open, then the relevant entries corresponding to data stored in the open RLC block 506 are marked with a first indication that indicates that the source data (i.e., the data in the first source RLC block 504a, the second source RLC block 504b, and the third RLC block 504c of the source RLC blocks 502) cannot be erased or freed. In some examples, the first indication may also indicate that the source data cannot be erased or freed during a control sync operation. For example, if a garbage collection operation occurs or a control sync operation occurs, the blocks marked with the first indication are skipped and/or ignored. In some examples, the source blocks may be marked with the first indication when the data of the source blocks is relocated to a destination block. However, when the open RLC block 506 is closed, then the relevant entries corresponding to data stored in the open RLC block 506 are re-marked with a second indication that indicates that the source data (i.e., the data in the first source RLC block 504a, the second source RLC block 504b, and the third RLC block 504c of the source RLC blocks 502) can be erased or freed.

A list of source blocks 512 may store information corresponding to the database of source JBAs 508. In some examples, the list of source blocks 512 stores each entry of the database of source JBAs 508. The list of source blocks 512 may be maintained in volatile memory, such as the volatile memory 112 of FIG. 1, which may be SRAM, DRAM, or controller RAM. In other examples, each entry of the database of source JBAs may be stored in a block header of a relevant JBA. For example, the first entry 510a may be stored in a block header of the first source RLC block 504a stored in the open RLC block 506. In some examples, the controller 108 may maintain a table of source blocks that have the first indication indicating that the source block cannot be freed or erased in random access memory, such as SRAM, DRAM, and/or controller RAM.

Figure 6:
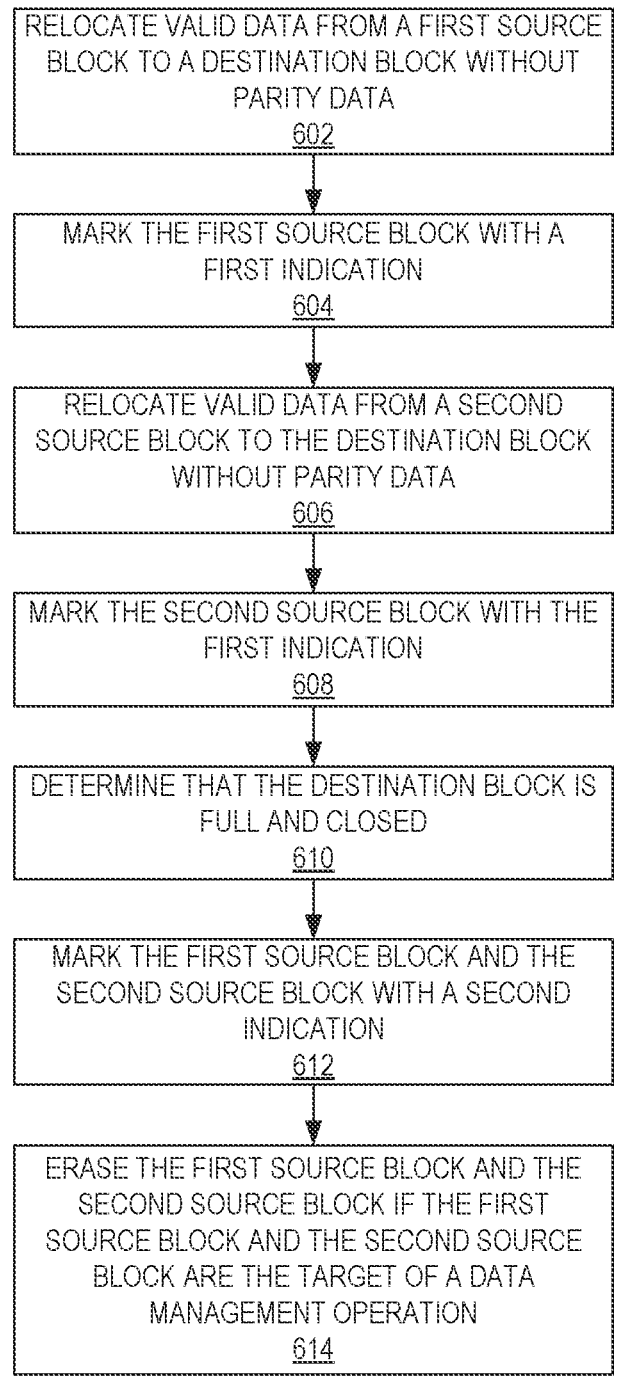
FIG. 6 is a flow diagram illustrating a method of reliable relocation of valid source block data to a destination block, according to certain embodiments.

FIG. 6 is a flow diagram illustrating a method 600 of reliable relocation of valid source block data, such as the valid FMUs of the source block 302 of FIG. 3, to a destination block, such as the destination block 306 of FIG. 3, according to certain embodiments. For exemplary purposes, aspects of the storage system 100 of FIG. 1 and the block diagram 500 of FIG. 5 may be referenced herein. For example, method 600 may be implemented by the controller 108 of the data storage device 106.

At block 602, the controller 108 relocates valid data from a first source block, such as the first RLC block 504a of the RLC source blocks 502, to a destination block, such as the open RLC block 506. The relocated valid data from the first source block does not include parity data. Although parity data is exemplified, the embodiments herein may be applicable to other data protection mechanisms that may involve adding additional data to the data programmed to the NVM 110. At block 604, the controller 108 marks the first source block with a first indication, where the first indication indicates that the source block cannot be erased or freed. In some examples, the first indication indicates that the source block cannot be erased or freed during a control sync operation. At block 606, the controller 108 relocates valid data from a second source block, such as the second RLC block 504b of the RLC source blocks 502, to the destination block (e.g., the open RLC block 506). Likewise, the relocated valid data from the second source block does not include parity data. At block 608, the controller 108 marks the second source block with the first indication. If the data stored in the destination block (e.g., the open RLC block 506) becomes corrupted or needs to be rebuilt, then the controller 108 may read the relevant source block to restore the relevant data.

At block 610, the controller 108 determines that the destination block (e.g., the open RLC block 506) is full and closed. It is to be understood that the controller 108 may program parity data to the destination block (e.g., the open RLC block 506) when the controller 108 determines that the destination block (e.g., the open RLC block 506) is about to be closed. When destination block (e.g., the open RLC block 506) is closed or about to be closed, such as when the controller 108 determines that the destination block (e.g., the open RLC block 506) is either filled to a minimum threshold limit for closing a block or has been open for at least a predetermined threshold period of time, the controller 108 may then generate parity data for the closed or about to be closed destination block (e.g., the open RLC block 506). The generated parity data may be a minimal amount of parity data to protect the data stored in the destination block 306. In one example, if the destination block (e.g., the open RLC block 506) has available memory space and is not yet closed, then the controller 108 may program the generated parity data to the destination block (e.g., the open RLC block 506). In other examples, even if the destination block (e.g., the open RLC block 506) has available memory space and is not yet closed, the controller 108 may program the generated parity data to a selected block for parity data. In the previously described example, the controller 108 may program dummy data to the destination block (e.g., the open RLC block 506) to fill and close the destination block. In yet another example, if the destination block (e.g., the open RLC block 506) is filled and/or closed, the controller 108 may program the generated parity data to a selected block for parity data.

At block 612, the controller 108 re-marks the first source block and the second source block with a second indication, where the second indication indicates that the relevant source block can be freed or erased. At block 614, the controller 108 is configured to erase the first source block and the second source block when the first source block and the second source block are the target of a data management operation. In some examples, the controller 108 may erase the first source block and the second source block immediately after the destination block (e.g., the open RLC block 506) is closed. In other examples, the controller 108 may erase the first source block and the second source block after a threshold period of time has elapsed. In yet other examples, the controller 108 may erase the first source block and the second source block when a control sync operation occurs. It is to be understood that the controller 108 may still program user data with the necessary data protection for data that was not relocated to the destination block (e.g., the open RLC block 506). In other words, data that is programmed to the source block that is not associated with any source blocks may still include the necessary data protection mechanisms.

By not freeing or erasing source blocks whose data is located in an open destination block, parity data and the like may not be necessary for relocated data in the open destination block, which may lead to increased storage space and decreased write amplification of the data storage device.

In one embodiment, a data storage device includes a memory device and a controller coupled to the memory device. The controller is configured to relocate first valid data from a first source block to a destination block, where the first source block is marked with a first indication to indicate that that first source block cannot be freed, relocate second valid data from a second source block to the destination block, where the second source block is marked with the first indication to indicate that that second source block cannot be freed, determine that the destination block is closed, and erase the first source block and the second source block.

The controller is further configured to re-mark the first source block and the second source block with a second indication upon determining that the destination block is closed. The second indication indicates that the first source block and the second source block can be freed. The relocated first valid data and the relocated second valid data does not include parity data. The first valid data and the second valid data includes parity data. The controller is further configured to maintain a list of source blocks that have the first indication. The list of source blocks are maintained in random access memory (RAM). When a block is closed, the controller is further configured to check the list of source blocks to determine if there are any source blocks associated with the block that is closed. The controller is further configured to erase one or more source blocks associated with the block that is closed. The controller is further configured to store source block information associated with relocated source data in a destination block header of the destination block. The first indication indicates that a block cannot be freed during a control sync (CS) operation.

In another embodiment, a data storage device includes a memory device and a controller coupled to the memory device. The controller is configured to relocate data from a source block to a destination block without erasing the relocated data from the source block and erase the source block when the destination block is closed.

The source block is closed when the data is relocated from the source block to the destination block. The controller is further configured to recover data from the source block after the data is relocated from the source block to the destination block. The controller is further configured to execute a control sync (CS) operation. The source block is not erased during the CS operation. The controller is further configured to mark the source block as can be freed when the destination block is closed. The can be freed indication indicates that the source block can be freed during a control sync (CS) operation. The controller is further configured to maintain a mapping associating one or more source blocks associated with the relocated data of the destination block to the destination block, and wherein the mapping is stored in random access memory. The destination block includes a destination block header, and wherein the destination block header includes a mapping associating one or more source blocks associated with the relocated data of the destination block to the destination block.

In another embodiment, a data storage device includes memory means and a controller coupled to the memory means. The controller is configured to erase a source block during a control sync (CS) operation having an indication of can be freed. The erasing occurs after a destination block including valid data of the source block is closed.

The source block includes parity data and the destination block does not include parity data. The source block is used for data recovery of the destination block when the destination block is open.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
maintain a database of source jumbo block addresses (JBAs);
relocate first valid data from a first source block to a destination block;
mark an entry in the database for the first source block with a first indication to indicate that the first source block cannot be freed;
relocate second valid data from a second source block to the destination block, wherein the relocated first valid data and the relocated second valid data does not include parity data, wherein the first valid data and the second valid data includes parity data;
mark an entry in the database for the second source block with the first indication to indicate that the second source block cannot be freed;
determine that the destination block is closed, wherein the determining occurs after the marking;
generating parity data for the relocated first valid data and the relocated second valid data, wherein the generating occurs after closing the destination block;
re-mark the entry in the database for the first source block with an indication that indicates data in the first source block can be erased or freed, wherein the re-marking occurs after the determining;
re-mark the entry in the database for the second source block with an indication that indicates data in the second source block can be erased or freed; and
erase the first source block and the second source block after a threshold period of time has elapsed.

2. The data storage device of claim 1, wherein the database is maintained in random access memory (RAM).

3. The data storage device of claim 1, wherein, when a block is closed, the controller is further configured to check the database to determine if there are any source blocks associated with the block that is closed.

4. The data storage device of claim 1, wherein the controller is further configured to store source block information associated with relocated source data in a destination block header of the destination block.

5. The data storage device of claim 1, wherein the first indication indicates that a block cannot be freed during a control sync (CS) operation.

6. A data storage device, comprising:
a memory device; and
a controller coupled to the memory device, the controller configured to:
maintain a database of source jumbo block addresses (JBAs);
relocate data from a source block to a destination block, wherein the relocated data does not include parity data, wherein the data in the source block includes parity data;
mark an entry in the database for the source block with a first indication to indicate that the source block cannot be freed;
determine that the destination block is closed, wherein the determining occurs after the marking;
generating parity data for the relocated data, wherein the generating occurs after closing the destination block;
re-mark the entry in the database for the source block with an indication that indicates data in the source block can be erased or freed, wherein the re-marking occurs after the determining; and
erase the source block after a threshold period of time has elapsed.

7. The data storage device of claim 6, wherein the source block is closed when the data is relocated from the source block to the destination block.

8. The data storage device of claim 6, wherein the controller is further configured to recover data from the source block after the relocated data is relocated from the source block to the destination block.

9. The data storage device of claim 6, wherein the controller is further configured to execute a control sync (CS) operation, and wherein the source block is not erased during the CS operation.

10. The data storage device of claim 6, wherein the can be erased or freed indication indicates that the source block can be freed during a control sync (CS) operation.

11. The data storage device of claim 6, wherein the database is stored in random access memory.

12. The data storage device of claim 6, wherein the destination block includes a destination block header, and wherein the destination block header includes a mapping associating one or more source blocks associated with the relocated data of the destination block to the destination block.

13. A data storage device, comprising:
- memory means; and
- a controller coupled to the memory means, the controller configured to:
  - mark an entry in a database for a source block with a first indication to indicate that the source block cannot be freed, wherein the database contains source jumbo block addresses (JBAs);
  - determine that a destination block is closed, wherein the determining occurs after the marking, wherein the source block includes parity data and the destination block does not include parity data, and wherein the source block is used for data recovery of the destination block when the destination block is open;
  - generating parity data for the data in the destination block, wherein the generating occurs after closing the destination block;
  - re-mark the entry in the database for the source block with an indication that indicates data in the source block can be erased or freed, wherein the re-marking occurs after the determining; and
  - erase the source block
    - after a threshold period of time has elapsed.

* * * * *